United States Patent [19]

Bevilacqua

[11] 4,035,230
[45] July 12, 1977

[54] SHOCK BUFFER FOR NUCLEAR CONTROL ASSEMBLY

[75] Inventor: Frank Bevilacqua, Windsor, Conn.

[73] Assignee: Combustion Engineering, Inc., Windsor, Conn.

[21] Appl. No.: 546,410

[22] Filed: Feb. 3, 1975

Related U.S. Application Data

[63] Continuation of Ser. No. 334,185, Feb. 20, 1973, abandoned.

[51] Int. Cl.² .................................... G21C 7/20
[52] U.S. Cl. ................ 175/36 R; 176/36 S; 176/86 R
[58] Field of Search ............. 176/35, 36 R, 36 S, 176/86 R

[56] References Cited

U.S. PATENT DOCUMENTS

| | | | |
|---|---|---|---|
| 3,231,473 | 1/1966 | Hennig | 176/36 R |
| 3,235,464 | 2/1966 | Ashcroft | 176/36 R |
| 3,346,459 | 10/1967 | Prince et al. | 176/36 R |
| 3,448,006 | 6/1969 | Fortescue et al. | 176/36 R |
| 3,481,832 | 12/1969 | Rickert | 176/86 R |
| 3,595,748 | 7/1971 | Frisch et al. | 176/36 R |
| 3,607,629 | 9/1971 | Frisch et al. | 176/36 R |
| 3,625,816 | 12/1971 | Aleite et al. | 176/35 |
| 3,734,825 | 5/1973 | Schabert et al. | 176/86 R |

*Primary Examiner*—Harvey E. Behrend
*Attorney, Agent, or Firm*—Stephen L. Borst; Richard H. Berneike

[57] ABSTRACT

A shock buffer is provided for the gradual deceleration of a rapidly descending control element assembly in a nuclear reactor. The interactive buffer components are associated respectively with the movable control element assembly and part of the upper guide structure independent of and spaced from the fuel assemblies of the reactor.

Preferably, the buffer is of the piston and cylinder type, with a piston extending upward from a tube sheet of the upper guide structure and a cylinder opening downward and carried by the control element assembly near its upper end. The cylinder descends about the buffer piston near the lower extent of control element assembly travel. Liquid naturally occupying the buffer cylinder, as the reactor coolant at the ambient pressure within the reactor, provides hydraulic decelerating forces on the control element assembly when relative insertion of the piston in the cylinder occurs.

8 Claims, 5 Drawing Figures

SHOCK BUFFER FOR NUCLEAR CONTROL ASSEMBLY

This is a continuation, of application Ser. No. 334,185, filed Feb. 20, 1973 now abandoned.

BACKGROUND OF THE INVENTION

The invention relates to shock buffers and more particularly to a shock buffer for a control element assembly in a nuclear reactor. More particularly still, part of the buffer mechanism is fixedly positioned in the reactor in spaced relationship with the fuel assemblies of the core.

In a nuclear reactor, control elements are provided for insertion into the core or fuel region of the reactor to control and regulate its reactivity and power level. These control elements contain materials known as poisons which absorb neutrons thereby lowering the local neutron flux. In normal operation, the control elements are withdrawn at least partially from the core region and their position may be controlled to regulate the reactor. In the event of an emergency in which the reactor must be shut down, it is necessary to rapidly insert most or all of these control elements fully into the core. This emergency procedure of inserting control elements is referred to as "scramming".

Control elements which enter the reactor core from above and are withdrawn from the core to a position thereabove can be scrammed by allowing the control elements to fall into the core by the force of gravity. This is normally accomplished by simply disengaging the control elements and drive train from the drive mechanism. It is necessary, however, to provide means for gradually slowing down or decelerating the control elements just prior to their reaching their extreme lower position in the core to prevent damage to the reactor internals or to the control elements.

Various buffering arrangements associated with individual control elements or with a control element assembly including a plurality of control elements have been provided to effect the controlled deceleration of the control elements. One type of buffering means often used is that of a piston and cylinder combination wherein the piston, associated with the dropping control element, forces displacement of a fluid or liquid from the cylinder into which it is entering. The resistance of the fluid to displacement serves to decelerate the dropping control element. One such piston and cylinder type of buffer is shown in U.S. Pat. 3,314,859 issued Apr. 18, 1967 to A. J. Anthony entitled "Nuclear Reactor Fuel Assembly in Control Rod Organization". This buffer is provided by allowing the control element, and particularly the lower end portion thereof, to serve as the piston. With this arrangement, fluid coolant may enter the control element guide tube through an opening positioned several inches above the bottom thereof. When the falling control element is adjacent this opening, it serves to partially block exit of the fluid coolant from the remaining bottom portion of the guide tube and this fluid acts upwardly against the falling control element to effect a gradual deceleration of the control element and apparatus attached thereto.

In another arrangement, the guide tube has a reduced diameter in its lower section to aid in the pressure buildup against the lower end of the falling control element. While providing effective deceleration to the falling control element, this type of buffer has the disadvantage of imposing large compressive axial loading on the control element. These compressive stresses may cause buckling and/or rupturing of the control element due to the significant weight of the control element assembly, most of which is above the buffer region of the control element. Also, because of the large pressure increase in its lower portion, the guide tube may require a reinforcing structure which adversely affects neutron economy in the region. Further too, fluid pressures on the control element, particularly near its lower end during buffering, may require reinforcement of this region of the control element to prevent damage or deformation thereto. Further still, the regions of the control element containing a neutron poison therewithin are subject to some degree of swelling because of irradiation induced volumetric expansion of the commonly used $B_4C$ neutron poison pellets, thus creating the possibility of the control element jamming in the buffering portion of the guide tube and changes in buffering characteristics. In order to prevent such a situation, this region of the control element replaces the $B_4C$ poison with silver-indium-cadmium poison which expands less but is more expensive.

Another type of control element buffer using a piston and cylinder arrangement is shown in U.S. Pat. No. 3,518,162 issued June 30, 1970 to H. V. Lichtenberger entitled "Nuclear Reactor Control Element Drive Apparatus". This particular control element buffer is located well above the reactor core region and in fact beyond the reactor pressure vessel and within the housing including the drive mechanism for the control elements. With such an arrangement the piston, to which the control element decelerating forces are applied, is associated with the drive member to which the control element is coupled below. With the piston so positioned, decelerating forces thereupon will act to apply only, or principally, tensile stresses to the control element below, thus avoiding some of the undesirable effects attendant to placing the control element in compression. However, this arrangement also has its deficiencies in that the piston and cylinder combination are located in a region of limited or poor accessibility in the event maintenance or repairs are to be effected. More importantly, if the coupling between the control element drive member and the control element itself should open and disengage the control element, permitting it to drop, the piston associated with the drive member will be ineffective in decelerating the dropped control element.

A control element buffer arrangement which avoids the problem of compressively loading the control element and further, which locates the buffering mechanism in an area of the reactor which is relatively frequently accessible, is depicted and described in U.S. application Ser. No. 234,929 filed Mar. 15, 1972 by Albert Lowery Gaines entitled "Control Element Buffer, now abandoned". This buffer is of the piston and cylinder type and utilizes a fitting, such as an alignment post, associated with and located at the upper end of a fuel assembly as the buffer cylinder. A portion of the control element assembly above the poison region of the control element is sized and shaped to provide the buffer piston. With this arrangement, the piston descending with the control element assembly enters the stationary, upwardly open alignment post, serving as the cylinder and filled with liquid, and decelerates descent of the assembly without compressively loading the control elements.

Another buffer arrangement which avoids the problem of compressively loading the control element and further, may avoid loading the fuel assembly during the buffering operation, is that disclosed in U.S. Pat. No. 3,448,006 issued June 3, 1969 to P. Fortescue et al entitled "Control Rod Drive System". However, this arrangement utilizes a fixedly positioned cylinder which is substantially closed, save for an opening at each end sized only large enough to pass a piston rod continuously therethrough. The cylinder is connected to, and the piston and buffer operated by, a source of pressurized fluid isolated from the coolant fluid of the reactor, thus creating a rather complex buffer.

In most of the above-described buffers, the control element assembly decelerating forces are transmitted to the fuel assembly, causing unnecessary, and possible undesirable stressing thereof. Further, most require the presence of the fuel assembly in order to effect buffering of the rapidly inserted control element assembly, the buffering capability being absent without the fuel assembly. Further still, many of the prior art buffers utilize a coolant flow channel, such as a guide tube, as the buffer cylinder and accordingly, impede or prevent desirable coolant flow when the control element assembly is fully inserted. Still further, most of the buffering arrangements described above have relied upon a stationary, upwardly open cylinder and a downwardly traveling piston to provide the requisite buffering action. In every such instance, the cylinder is oriented such that foreign materials known as crud, circulating with the coolant liquid, may easily accumulate and form deposits therein, thus interfering with proper operation of the piston within the cylinder. While such a problem might be minimized by providing a crud vent opening at or near the bottom of the cylinder, this would require extending the piston-cylinder stroke length to compensate for the liquid lost through the vent opening during buffering. Further too, this measure would only vent crud smaller than a certain particle size.

SUMMARY OF THE INVENTION

The present invention is directed to a shock buffer for a control element assembly in a nuclear reactor wherein the control element assembly may be used for emergency shutdown or scram and is disengagingly connected with an upper drive mechanism. A guide structure for the control element assembly is positioned above the core region of the reactor and is supported independently of the fuel assemblies in the core. The control element assembly is adapted to descend rapidly into the guide structure and core during a scram.

A buffer is provided for decelerating the descending control element assembly near its fully inserted limit of travel and comprises a buffering mechanism associated with and coacting between the guide structure spaced above the fuel assemblies and the upper portion of the control element assembly. While the invention broadly includes any of a variety of buffering means structured and positioned to coact directly between the upper portion of the control element assembly and a part of the upper guide structure, it preferably comprises a piston and cylinder combination.

In a preferred embodiment, an upwardly extending piston is rigidly affixed to the upper plate of a tube sheet in the upper control element assembly guide structure and a cylinder which opens downwardly is carried by the control element assembly near its upper end in alignment with the piston. The downwardly open cylinder avoids accumulation of sedimentary deposits and may thus be somewhat smaller than a corresponding cylinder which opens upwardly and requires a sediment relief port in its lower end. Further, the buffer may conveniently avoid use of a coolant channel thereby avoiding impediment of the coolant flow through the channel, particularly if no control element exists along the center line of the control element assembly.

Preferably, the buffer cylinder is formed as part of the control element assembly yoke from which the control elements depend. The buffer cylinder, or cylinders if more than one are required, is positioned such that the upward decelerating force applied to the control element assembly acts substantially entirely along the vertical axis passing through the center of gravity of the control element assembly. In the preferred embodiment of the invention, a plurality of control elements depend from the yoke portion of the control element assembly and are symmetrically disposed about a vertical member or shaft within the yoke, the buffer cylinder being formed by and within this shaft member.

DESCRIPTION OF THE PREFERRED EMBODIMENT

Figure 1:
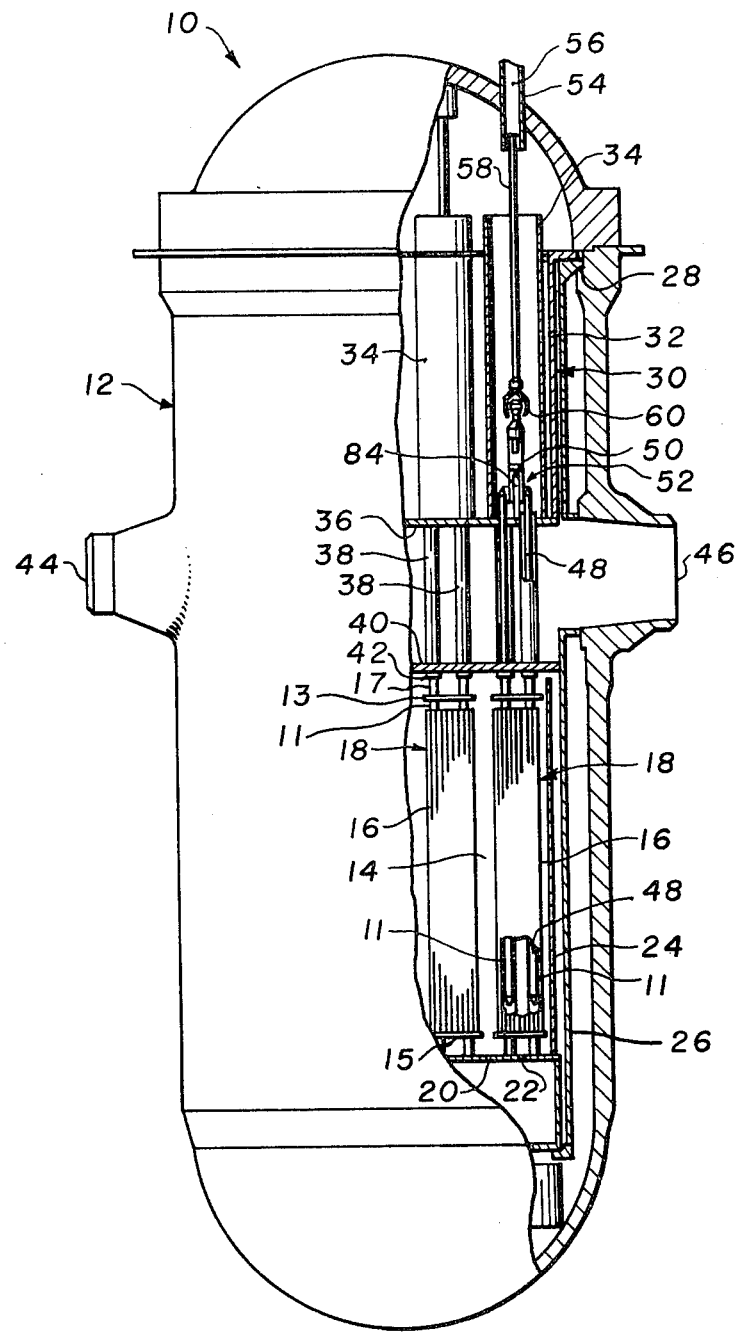
FIG. 1 is an elevation view partially in cross-section illustrating a nuclear reactor embodying the present invention.

Referring now to FIG. 1 there is shown a nuclear reactor 10 including a reactor vessel 12, which includes therewithin a core or fuel region 14. Fuel region 14 is comprised of and defined by a plurality of nuclear fuel elements 16 contained in groups in fuel assemblies 18. Fuel assemblies 18 include vertically extending hollow guide tubes 11 therewithin and affixed to upper and lower end plates 13 and 15 respectively as a rigid support therebetween. Tubes 11 form the skeletal supporting structure for fuel assemblies 18. Hollow alignment posts 17, in registry with guide tubes 11, extend upwardly and downwardly from fuel assembly plates 13 and 15 respectively. Fuel assemblies 18 are supported in position by lower support plate 20 which has apertures 22 therein for admitting coolant to the reactor core 14. Surrounding the core and also affixed to the lower support plate 20 is the core shroud 24. The lower support plate 20 and the entire core assembly is supported by the core support barrel 26 which hangs from the lip 28 of reactor vessel 12.

An upper guide structure, here generally designated 30, is positioned above fuel region 14, generally in spaced relationship therewith and is supported independently of the fuel assemblies 18 of the fuel region. This upper guide structure is of the type depicted and described in U.S. application Ser. 266,858 filed June 28, 1972 by Frank Bevilacqua entitled "Guide Structure for Control Elements, now U.S. Pat. No. 3,849,257 issued Nov. 19, 1974". Briefly, upper guide structure assembly 30 also hangs from lip 28 of reactor vessel 12 and is disposed within core support barrel 26. Guide structure assembly 30 includes a support barrel 32 supported by reactor vessel 12 and having a support plate 36 across and affixed to the lower end of the barrel. Vertically extending shrouds 34 extend upwardly from and are affixed to support plate 36 within barrel 32 and each surround the girth of a control element assembly. Support plate 36 forms the upper tube sheet for a plurality of hollow upper guide tubes 38 which are affixed thereto and depend vertically therefrom. A plate 40 forms the lower tube sheet for guide tube 38. Tubes 38 serve to support plate 40, as by being affixed thereto or by support lands affixed to the lower ends of the tubes, as described in the aforementioned U.S. Pat. No. 3,849,257 to Bevilacqua. Plate 40 extends across the core region 14 and is supported a short distance thereabove by tubes 38. Tubes 38 and plates or tube sheets 36 and 40 comprise a significant portion of the upper guide structure assembly 30. The upper guide tubes 38 are in registry with apertures in support plates 36 and 40 which are in turn in registry with hollow alignment posts 17 and fuel assembly guide tubes 11. Alignment posts 17 extend upwardly into sliding engagement with extensions 42 of upper guide tubes 38 depending downwardly from plate 40, to provide lateral alignment to the fuel assemblies 18. Further, plate 40 and/or tube extensions 42 acts to limit any upward movement of fuel assemblies 18.

In operation, a liquid coolant such as water enters inlet nozzle 44 of reactor 10 and flows downwardly around the outside of the core support barrel. The coolant then flows inwardly and up through the openings 22 in the lower support plate 20 through core region 14 whereupon it is heated. The coolant then flows upwardly through openings (not shown) in plate 40 and outwardly through holes (not shown) in the wall of core support barrel 26 and outlet nozzle 46. Additionally, holes, not shown, through plate 36 and control element assembly shrouds 34 permit the coolant to flood and fully occupy the region within vessel 12 above support plate 36 and particularly within shrouds 34. Generally speaking, the coolant in this latter mentioned area is relatively stagnant compared with the coolant flow in the other regions of vessel 12, particularly in the region of upper guide tubes 38 and outlet nozzle 46.

Control of the neutron flux within the core region 14 is effected in a well known manner through the use of control elements 48 which contain or are comprised of a neutron poison. Control elements 48 are reversibly insertable from above into and through tubes 38 and into guide tubes 11 in fuel assemblies 18 to effect the desired control. Typically, a plurality of control elements 48 are joined by and depend from a common yoke 50 and in combination comprise a control element assembly 52. Control element assembly 52 and accordingly control elements 48 are vertically reciprocated by control element assembly drive means, not shown, mounted on nozzle 54. The control element assembly driving means is connected with control element assembly 52 by means of a drive rod 56 and an extension rod 58 attached thereto. Releasable gripper means 60 at the lower end of extension rod 58 grips control element assembly 52 during normal operation to effect reciprocation thereof and may be disengaged from the control element assembly preparatory to refueling. The normal operational stroke length of a control element assembly 52 is typically about 13–15 feet.

Under normal operation, control element assembly 52 is normally continuously engaged with the drive means and is reciprocated upwardly or downwardly as needed in a controlled and relatively slow manner. However, in the event of an emergency, drive rod 56 will be disengaged, or released, from the drive means thereby permitting it, extension shaft 58, and control element assembly 52 to descend rapidly under the influence of gravity to a fully, or nearly fully, inserted position. This operation, termed a scram, permits rapid insertion of the control elements 48 into a fuel assembly 18. In order to prevent damage to the control element assembly 52 and/or fuel assembly 18 and its guide tubes 11, it is necessary to gradually decelerate the control element assembly prior to its attaining the normally fully inserted position. This is accomplished by means of the buffer of the invention which effects this deceleration near the lower or fully inserted extent of travel of the control element assembly.

Figure 2A:
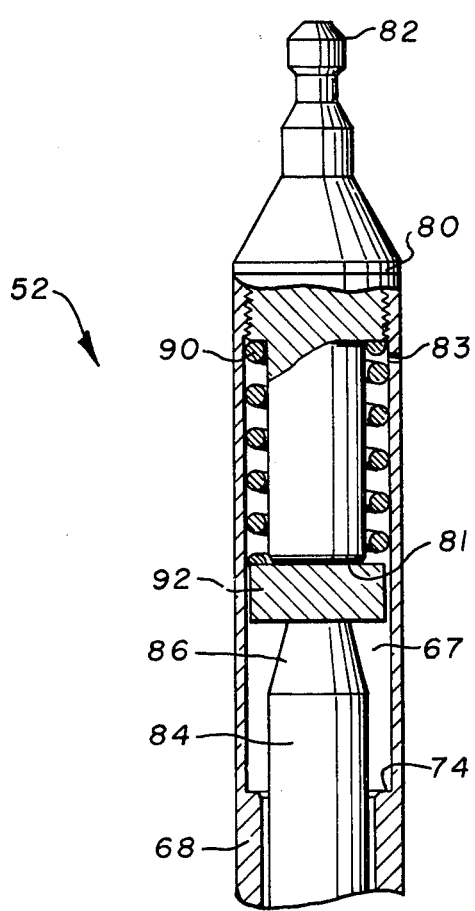
FIG. 2a is an enlarged vertical cross-section view of a control element assembly employing the buffer of the invention and showing the control element assembly in the fully inserted position.
Figure 3A:
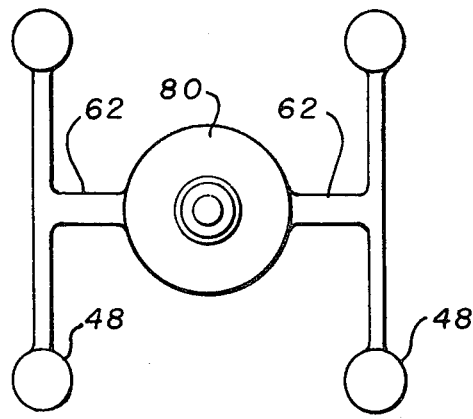
FIG. 3a is a top view of the control element assembly incorporating the buffer of the invention as depicted in FIGS. 2a and 2b.
Figure 3B:
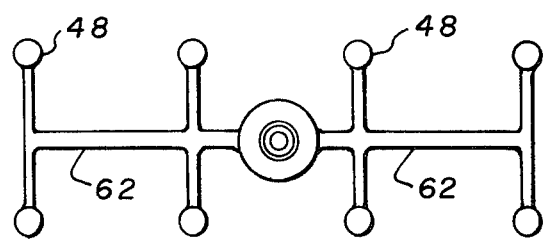
FIG. 3b is a view similar to that of 3a showing an alternate form of control element assembly geometry incorporating the buffer of the invention.

Referring now to FIG. 2a, control element assembly 52 incorporates the buffer of the invention and is shown in greater detail. The control element assembly is shown disconnected from extension shaft 58 to simplify the drawing; however, it will be realized that shaft 58 will normally be connected to it during a scram. As earlier mentioned, control element assembly 52 comprises a plurality of fingers or control elements 48 depending vertically from a common yoke 50. Control elements 48 are affixed to a horizontally extending leg or spider portion 62 of yoke 50. Spider 62, in the embodiment shown, is a stainless steel casting having an $h$ shape seen more clearly in the FIG. 3a plan view of control element assembly 52. Spider 62 includes a hole or bore extending vertically therethrough at the center thereof and having a threaded portion. The control elements 48 are affixed to the outer extremes of spider 62 as seen in FIG. 3a. It will be appreciated that spider 62 might take a variety of forms to accommodate more or fewer control elements 48, one such form being that shown in FIG. 3b wherein a single control element assembly 52 includes eight control elements 48 affixed to and supported by a modified or double H type of spider 62.

A piston and cylinder are coactively associated with yoke 50 and plate 36 to effect the required buffering. While an arrangement which affixes the cylinder to plate 36 and the piston to yoke 50 is considered within the scope of the invention, the preferred arrangement affixes the buffer piston to plate 36 and the cylinder to yoke 50. As used herein, "affixed" is meant to broadly include either one structure being attached to another or such structure being integrally formed with the other.

Yoke 50 of control element assembly 52 further includes a central hub or shaft portion which houses the piston receiving cylinder of the buffer of the invention. This hub portion includes vertically extending hollow cylinder 68. Cylinder 68 is formed of stainless steel. The upper portion of cylinder 68 is so formed or machined to increase its inside diameter relative to that of the lower portion whereby a shoulder results, creating a stop 74 to be discussed more fully below. The lower outer periphery of cylinder 68 is provided with threads for engagement with the threads in the center bore of spider 62. In this manner, cylinder 68 is threadedly secured to spider 62. Locking means such as pin 75, extending into both cylinder 68 and spider 62 and being welded thereto, serve to rigidly afix the cylinder to the spider against relative movement therebetween. The outer periphery of cylinder 68 may be formed or machined near its lower end to provide a shoulder, creating stop 77 which is in contact with an upper surface of spider 62 when the spider and cylinder are joined. Stop 77 is located such that the lower end of cylinder 68 terminates a short distance above the lower end of spider 62. The upper end of cylinder 68 is closed by means of end plug 80. End plug 80 provides a fluid-tight seal at the upper end of cylinder 68, as by means of threaded and welded engagement therewith. End plug 80 includes a portion extending upwardly therefrom beyond cylinder 68 which forms a ball 82 which may be grippingly engaged by the releasible gripper 60 of extendion shaft 68. A downwardly extending portion of plug 80 forms stop 81 to be discussed below. Cylinder 68 with end plug 80 defines a cylindrical chamber 67 open at its lower end for receiving a buffer piston.

A restrictive hole or opening 83 extends through the wall of cylinder 68 near the upper end thereof below end plug 80. Opening 83 might typically have a diameter of 1/16 of an inch. Opening 83 is provided at or near the upper end of chamber 67 to allow any gas which might be entrapped within the chamber to vent therefrom. Under normal operating circumstances, it would not be anticipated that a gas, such as steam, would accumulate in the upper region of chamber 67. However, air might be entrapped in the chamber at the time control element assembly 52 is initially placed in reactor 10 and vent opening 83 will permit bleeding of this air from the chamber prior to its use for buffering. The area of opening 83 is sufficiently small that it vents very little of the coolant liquid during buffering and has no significant affect thereon.

Buffer piston 84 of the invention is a cylindrical stainless steel rod rigidly affixed at its lower end to support plate 36, as by threaded and welded engagement therewith, and extending upwardly therefrom in registry with chamber 67 defined by cylinder 68. The diameter of piston 84 is slightly less than the internal diameter of cylinder 68 to permit introduction of the piston into cylinder 68 and allow a narrow annular clearance therebetween. In the example of the preferred embodiment, buffering piston 84 has a diameter of 1.97 inches and cylinder 68 has a minimum ID of 2.00 inches. That portion of piston 84 extending above support plate 36 may be of uniform cross-sectional diameter or, preferably, is tapered inwardly at 86 near its upper end to facilitate introduction of the piston into the chamber 67. Correspondingly, the internal surface of the central bore in spider 62 is beveled downwardly outward near its lower end at 88 to further facilitate introduction of piston 84 thereinto.

The maximum downward extent of travel of control element assembly 52 might be limited by contact of spider 62 with support plate 36; however, according to the preferred embodiment, downward travel is limited by stop 81 and piston 84. Stop 81, which is a rod-like appendage depending from plug 80, is sized in length to contact the upper end of piston 84, or preferably a disk 92 interposed therebetween, prior to spider 62 contact support plate 36. This arrangement prevents contact of the under-surface of spider 62 with plate 36 and the weight of the control element assembly and associated drive train is supported by plate 36 through piston 84. This stop-limited position of maximum insertion is established such that the bottom of control elements 48 are at least fully inserted in the fuel region 14 of fuel assembly 18 just short of the lower end of guide tubes 11. This fully-inserted position is that depicted in FIG. 2a. In this position, the entire weight of control element assembly 52 and the associated drive train, which might be as much as 300–500 pounds, is supported as dead weight by support plate 36. This fully inserted position will result from a scram operation in which the drive means have been disconnected from the drive rod 56.

Figure 2B:
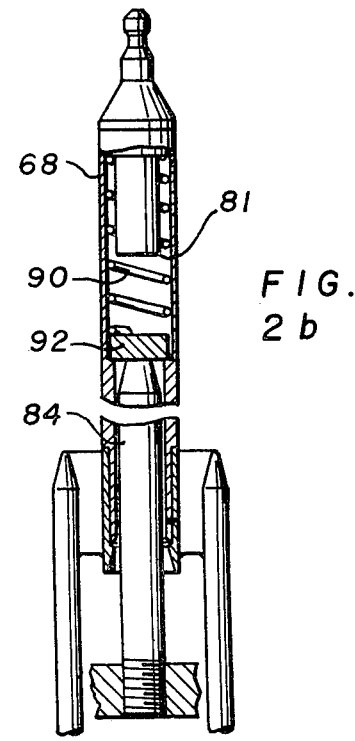
FIG. 2b is similar to that of FIG. 2a showing the piston inserted into the buffer cylinder a distance less than that occurring when the control element assembly is inserted to its downward limit.

Drive rod 56 normally has teeth which are engaged by the drive means and, in order to effectively recouple drive rod 56 with the drive means, it is often necessary that control element assembly 52 and associated drive train be flexibly supported a short distance above its downward limit position in a manner relieving some of its total weight from the drive means attempting to establish re-engagement therewith. This is accomplished by means of coil spring 90 within cylinder 68 acting. In compression, downwardly through disk 92, mentioned earlier, on piston 84 and upwardly on end plug 80 in control element assembly 52. Spring 90 is coaxially disposed about stop portion 81 of end plug 80. Disk 92 is circular in cros-section and is sized to slide within cylinder 68. Its downward travel is limited by stop 74, described earlier. Prior to buffer piston 84 contacting disk 92, the disk is biased against the stop 74 as shown in FIG. 2b. Spring 90 is designed such that its pre-load exceeds any pressure differential occurring across disk 92 as a result of fluid bleed through vent opening 83. When control element assembly 52 descends to a point at which piston 84 contacts disk 92, the disk will be moved upwardly by the piston until it contacts stop 81 to limit the downward extent of travel of the control element assembly. This further compresses spring 90 which in turn acts upwardly on the control element assembly to relieve it of some apparent weight as seen by the drive means, thereby facilitating re-engagement of the drive mechanism therewith. Spring 90 may be of a strength which causes the control element assembly 52 to rebound and come to rest at a position in which spider 62 is spaced slightly above plate 36 in a position intermediate those depicted in FIGS. 2a and 2b. Further, it will be appreciated that the compressively biased spring 90 is capable of aiding somewhat in the final deceleration buffering of a rapidly descending control element assembly 52.

In operation, when control element assembly 52 is scrammed, cylinder 68 which is filled with ambient coolant liquid descends rapidly through shroud 34 and descends over buffer piston 84 or, stated another way, piston 84 is relatively inserted into cylinder 68. As piston 84 enters cylinder 68, it displaces the liquid formerly occupying its volume within chamber 67. This fluid is displaced from chamber 67 through the narrow annular space existing between the piston and the cylinder. Because of the restricted area of this annular flow path, the liquid exerts an upward force against end plug 80 and accordingly control element assembly 52 and the associated drive train. This upward force serves to decelerate the rate of descent a sufficient amount to prevent damage to the control element assembly and/or cooperating structures.

In the preferred embodiment of the invention, the control element assembly 52 and associated drive train weigh approximately 400 pounds and a piston stroke length of about 10 inches is sufficient to safely decelerate the falling control element assembly 52. This stroke length includes only that distance traveled by the major diameter of piston 84 within the minor internal diameter of cylinder 68 and does not include the relative distance traveled by the tapered or beveled portions of the piston and cylinder. Accordingly, piston 84 and cylinder 68 need be little more than one foot in length each in the embodiment disclosed. However, it will be appreciated that this value may vary as a function of the number of buffers per assembly, the diameter of the piston and cylinder, the weight of the assembly and/or various geometrical limitations.

The upwardly directed force on the control element assembly 52 developed by the liquid in the buffer chamber 67 acts along the vertical center line or axis of the buffer chamber, in this instance cylinder 68. In order to prevent this upward decelerating force from applying a bending moment to the descending control element assembly 52, it is preferable that this force vector act substantially entirely along the imaginary vertical axis passing through the center of gravity of the control element assembly. With the control element assembly geometry of the embodiment described, and in most control element assemblies, the center of gravity is substantially vertically in line with the center of yoke 50 and gripping ball 82. Accordingly, as discussed and described herein, the vertical center line of the single buffer cylinder 68 is axially aligned with the vertical center line of yoke 50 and barrel 82, and accordingly, control element assembly 52.

In certain circumstances, it may be desirable to employ a plurality of buffer cylinders and pistons with each control element assembly. This may be occasioned by a need to shorten the stroke length because of height limitations or because of the weight of the control element assembly. A plurality of buffer piston and cylinder combinations as described hereinabove might obviously be substituted for the single combination previously described. If a plurality of buffer pistons and cylinders are associated with a single control element assembly it will, of course, be desirable to position them such that the net resultant upward decelerating force which they produce acts along the vertical axis passing through the center of gravity of the control element assembly. This is most easily affected by symmetrically positioning one or more similar buffer cylinders about the vertical center line of the control element assembly, assuming it extends through the center of gravity of the control element assembly.

It will be appreciated that the aforedescribed buffer arrangement, and particularly the location thereof, permits buffering of a rapidly descending control element assembly under test situations in which no fuel assemblies are present in the reactor core region. Further, the buffer does not interrupt or impede normal coolant flow at any stage of its actuation.

It will be understood that the embodiment shown and described herein is merely illustrative and that changes may be made without departing from the scope of the invention as claimed.

What is claimed is:

1. In a liquid cooled nuclear reactor having a reactor vessel, a core region within and supported by said vessel for containing fuel therein and including first vertical passages extending downwardly thereinto; a guide structure within and supported by said vessel above said core region, said guide structure including upper and lower spaced tube sheets and a plurality of vertically substantially continuous hollow tubes extending therebetween and affixed thereto, each tube in registry with one of said first passages to provide second vertical passages; a vertically reciprocable control element assembly comprising a yoke and a plurality of laterally spaced control elements depending from said yoke, said yoke disposed for vertical reciprocation above said upper tube sheet and each of said control element disposed for vertical reciprocation within one of said first passages and one of said second passages; and a shock buffer comprising a piston and cylinder oppositely affixed to said yoke and said upper tube sheet in vertical opposition to one another and the coolant liquid normally having free access to said cylinder and said piston acting to displace coolant liquid from said cylinder upon relative insertion thereinto.

2. In the nuclear reactor of claim 1 wherein said cylinder is open at the lower end and substantially closed at the upper end thereof and is affixed to said yoke; and said piston is affixed to said upper tube sheet and extends upwardly therefrom.

3. In the nuclear reactor of claim 2 wherein said piston and said cylinder are each shorter than the stroke length of said reciprocable control element assembly.

4. In the nuclear reactor of claim 1 wherein the control elements are laterally spaced from the vertically extending center line of said control element assembly and said piston and cylinder extend along said center line.

5. In the nuclear reactor of claim 3 wherein said cylinder includes a small vent opening near the upper end thereof.

6. In the nuclear reactor of claim 3 wherein said piston is tapered inward near its upper end to facilitate relative insertion into said cylinder.

7. In the nuclear reactor of claim 4 wherein said piston and said cylinder are each substantially shorter than the stroke length of said reciprocable control element assembly.

8. In the nuclear reactor of claim 7 wherein said cylinder includes a small vent opening near the upper end thereof.

* * * * *